Feb. 27, 1934.                    A. GAY                    1,949,158
                              MAILING MACHINE
                          Filed Dec. 19, 1930         11 Sheets-Sheet 1

INVENTOR
*Azel Gay*
his ATTORNEY

Feb. 27, 1934.  A. GAY  1,949,158
MAILING MACHINE
Filed Dec. 19, 1930  11 Sheets-Sheet 2

INVENTOR
Azel Gay
BY
his ATTORNEY

Feb. 27, 1934.　　　　A. GAY　　　　1,949,158

MAILING MACHINE

Filed Dec. 19, 1930　　　11 Sheets-Sheet 3

INVENTOR
Azel Gay
BY
his ATTORNEY

Feb. 27, 1934.   A. GAY   1,949,158
MAILING MACHINE
Filed Dec. 19, 1930   11 Sheets-Sheet 5

Feb. 27, 1934.    A. GAY    1,949,158
MAILING MACHINE
Filed Dec. 19, 1930    11 Sheets-Sheet 7

INVENTOR
Azel Gay
BY
his ATTORNEY

Feb. 27, 1934.　　　　A. GAY　　　1,949,158
MAILING MACHINE
Filed Dec. 19, 1930　　11 Sheets-Sheet 8

INVENTOR
Azel Gay
BY
his ATTORNEY

Feb. 27, 1934.    A. GAY    1,949,158
MAILING MACHINE
Filed Dec. 19, 1930    11 Sheets-Sheet 10

INVENTOR
Azel Gay
BY
his ATTORNEY

Feb. 27, 1934. A. GAY 1,949,158
MAILING MACHINE
Filed Dec. 19, 1930 11 Sheets-Sheet 11

INVENTOR
Azel Gay
BY
his ATTORNEY

Patented Feb. 27, 1934

1,949,158

UNITED STATES PATENT OFFICE 1,949,158

MAILING MACHINE

Azel Gay, Rochester, N. Y., assignor to Multipost Co., Rochester, N. Y., a corporation of New York Application December 19, 1930
Serial No. 503,382

33 Claims. (Cl. 216—28)

My present invention relates to mail handling machines and more particularly to machines of this character which are adapted for handling mail matter, such as envelopes, in the general course of the operations of sealing, postmarking, stamp affixing and permit printing (principally) first class delivery mail. My improvements relate more particularly to the stamp affixing and printing operations. The purpose of the present invention is to provide an improved stamp affixing or envelope marking machine or both which will conform to the requirements of the Post Office Department and will at the same time operate selectively; to affixed a stamp; cancel such affixed stamp; postmark a stamped envelope; print a permit upon the envelope or both cancel and postmark a previously applied stamp.

The improvements are directed in part to means for properly timing the passage of the envelope through the various instrumentalities recited; to the stamp affixing means and to provisions in connection with both the stamping and the making of an imprint upon the envelope whereby but one operation can be performed upon an individual envelope and no operation at all will be performed unless an envelope is actually in passage through the stamping or printing point.

To these and other ends the invention resides in certain improvements and combinations of parts, all as will be hereinafter more fully described, the novel features being pointed out in the claims at the end of the specification.

In the drawings.

Similar reference numerals throughout the several views indicate the same parts.

Although, as aforesaid, the present invention is addressed more particularly to features of stamp affixing and printing I have shown, in the present instance, a complete envelope handling machine in which the envelope is first moistened and sealed and then run through the stamping and printing mechanism. This being the case and it being a further fact that the sealing mechanism constitutes the subject matter of an independent application for patent Serial No. 536,382 filed by me May 11, 1931 and co-pending herewith, it is necessary herein only to give the general idea of the manner in which the envelopes are introduced into the machine through the sealing mechanism and thereafter ultimately come in contact with the stamping and printing mechanisms.

Figure 1:
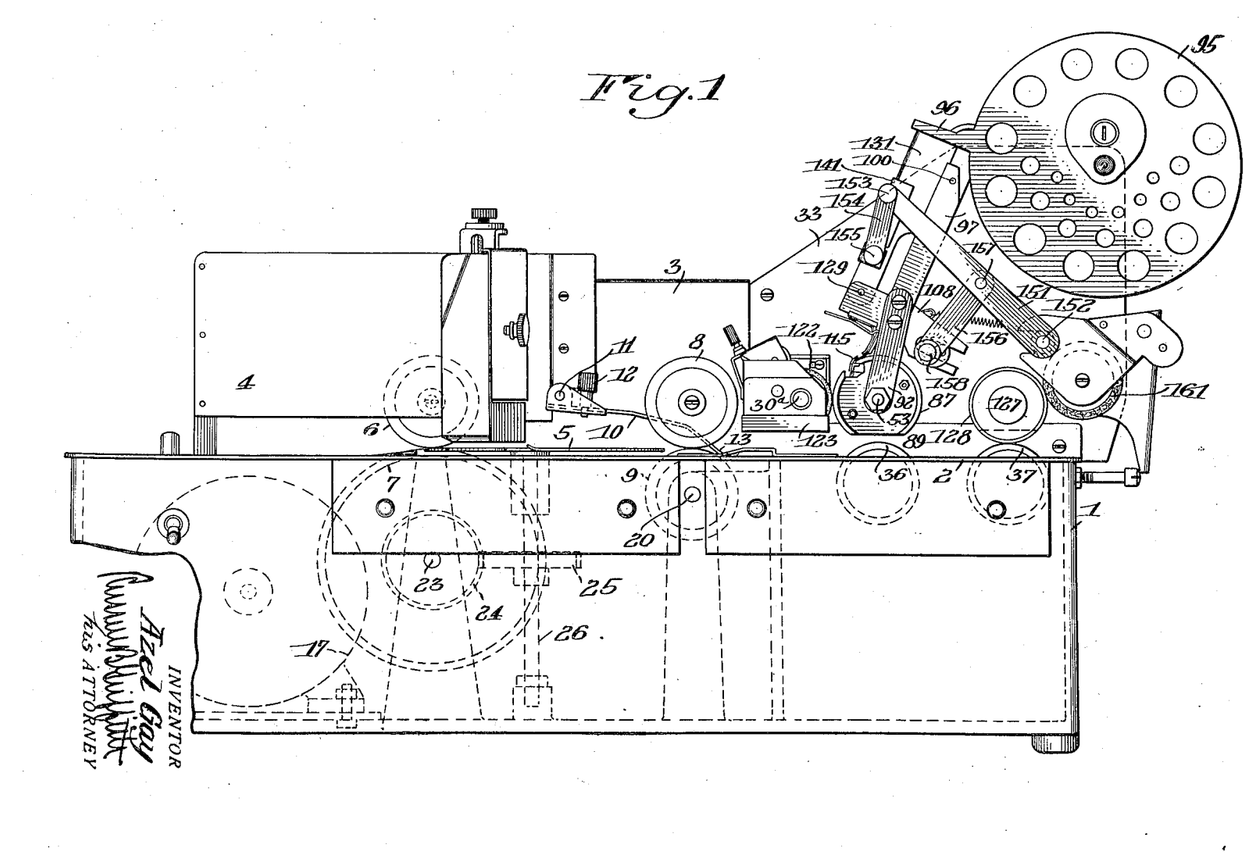
Fig. 1 is a front elevation of a stamp applying and cancelling apparatus constructed in accordance with and illustrating one embodiment of my invention.
Figure 2:
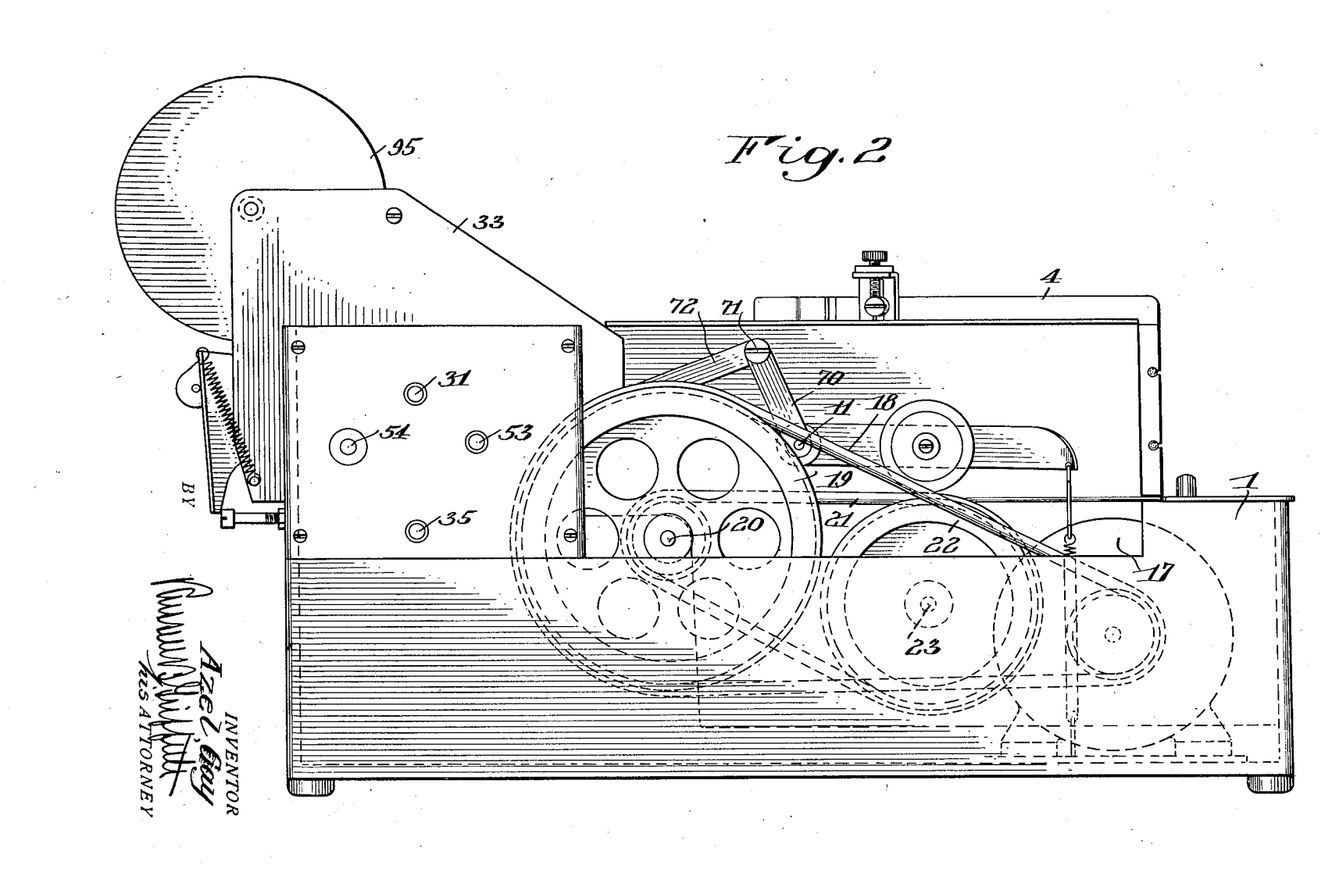
Fig. 2 is a rear elevation of the same.
Figure 4:
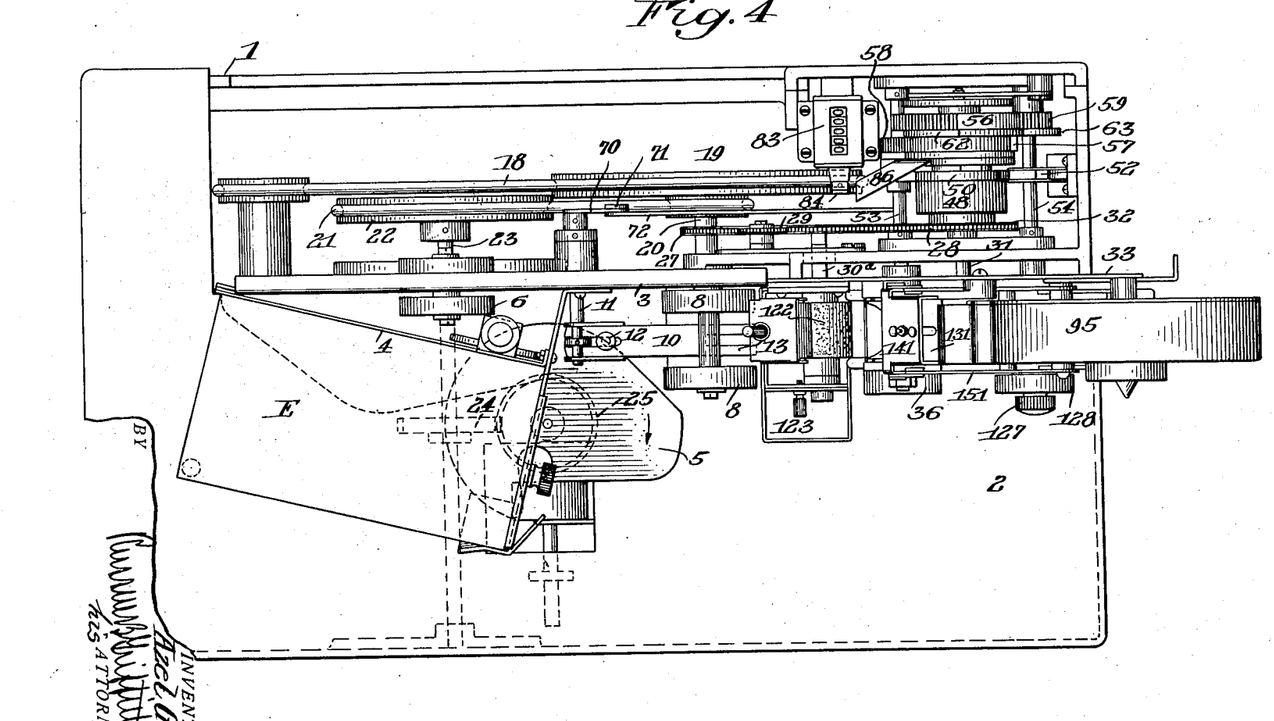
Fig. 4 is a top plan view of the moving parts having particular reference to the feeding of the envelope into the general direction of feed of the envelope marking mechanism, although the manner of feeding the envelope is covered by and disclosed in a companion application of this same inventor.

Referring first more particularly to Figs. 1, 2, and 4, 1 indicates the base or main frame of the machine supporting the table 2. Rising from this table is a back guide wall 3 that defines the path of travel of the envelope by contact with one edge thereof. The envelopes, indicated generally at E in Fig. 4 are stacked in a hopper 4, arranged angularly to the path of travel along the wall 3. The flaps of the envelopes E are on the under side. A rotary feeding or transfer device 5 successively engages the flaps of the undermost envelopes and transfers them, one at a time, from the hopper 4 to a position in the line of travel along the guide wall 3. In so doing this transfer device presents the single envelope between a pair of feed rolls 6 and 7 which latter grasp it and project it along the guide wall 3 through a pair of sealing rolls 8 and 9. The upper unit 8 of this sealing couple is divided at the center to accommodate between the parts thereof a trip finger 10 (Fig. 4) pivoted on a stud 11 projecting from the guide wall 3 and having an adjusting nut 12 associated therewith to regulate the bearing of its free forked end 13 on the table 2 in the path of the envelope.

The passage of an envelope or letter beneath this fork trips the stamp affixing mechanism and the printing mechanism, successively, as will be hereinafter described, it being understood at this point that such actuation by a single envelope results in one cycle of movement only of the stamp affixing mechanism and one cycle of movement only of the printing mechanism. These two mechanisms are shown generally in top plan view in Fig. 3, the first being indicated generally at S and the latter generally at P. A printing cylinder 14 has circumferentially spaced on its periphery a cancelling die 15 and a postmarking die 16. The progress of the envelope is made such that after it receives its stamp at S, the printing die 15 makes a cancelling impression upon the stamp and the adjacent portion of the envelope and the postmarking die 16 makes contact at the usual intermediate portion of the envelope back of the stamp where the postmark, including the date and receiving office, familiarly appears.

Driving mechanism

Figures 17, 18, 19:
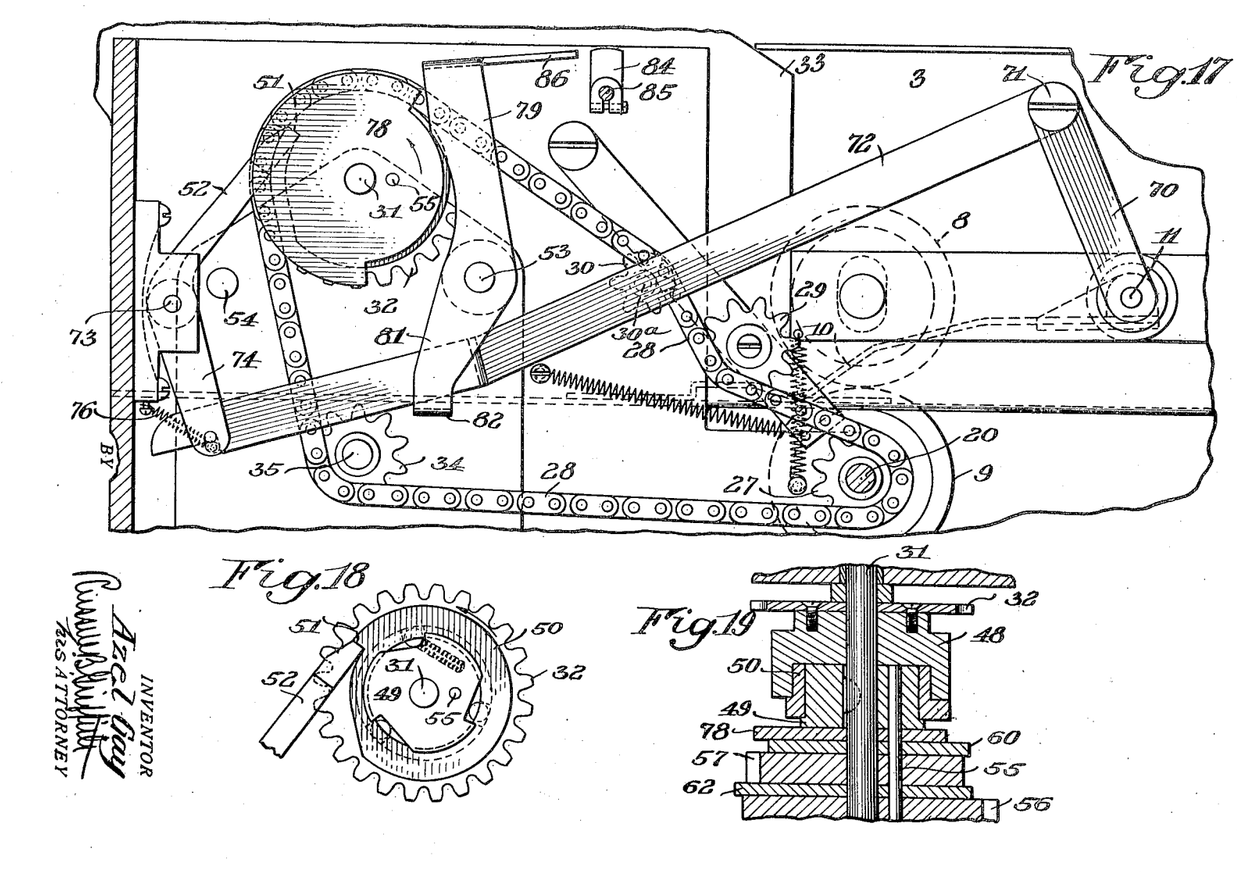
Fig. 17 is a rear elevation of the driving element showing the control of the parts which accomplish a single revolution of the stamp affixing and postmarking or permit marking devices upon a revolutionary cycle in the operation of the machine.
Fig. 18 is a detail view showing the cooperation of the pawl in the stop device of the permit marking or precancelling element of the machine.
Fig. 19 is a sectional view through the clutch device, permit marking and precancelling elements of the machine.

Referring more particularly to Figs. 1, 2 and 4, the machine as a whole is driven from a motor 17 located within the casing of the frame 1 which, through a belt 18 drives a large pulley 19 on primary driven shaft 20. From shaft 20, a belt 21 runs to a large pulley 22 on a shaft 23. The shaft 23 (Fig. 1) through gearing 24—25 turns a vertical shaft 26 (all shown in dotted lines) that carries the envelope feeder or transfer device 5 previously described. It also, positively drives the lower feed roll 7 that initially compels the envelope along its path of travel. Referring additionally to Fig. 17, driven shaft 20 carries thereon the lower roll 9 of the feeding and sealing couple, the upper unit 8 of which, as shown in dotted lines, rides in a slotted bearing so that it may give to accommodate letters of different thicknesses, as usual.

Also on this shaft 20 is a sprocket 27 which, through a sprocket chain 28 running under and over sprockets 29 and 30, drives the shaft 31 having a sprocket 32 thereon and mounted in a superstructure 33 on main frame 1. Continuing, the chain 28, through a sprocket 34, turns a stud 35 arranged below the table 2 and extending under it.

Figure 8:
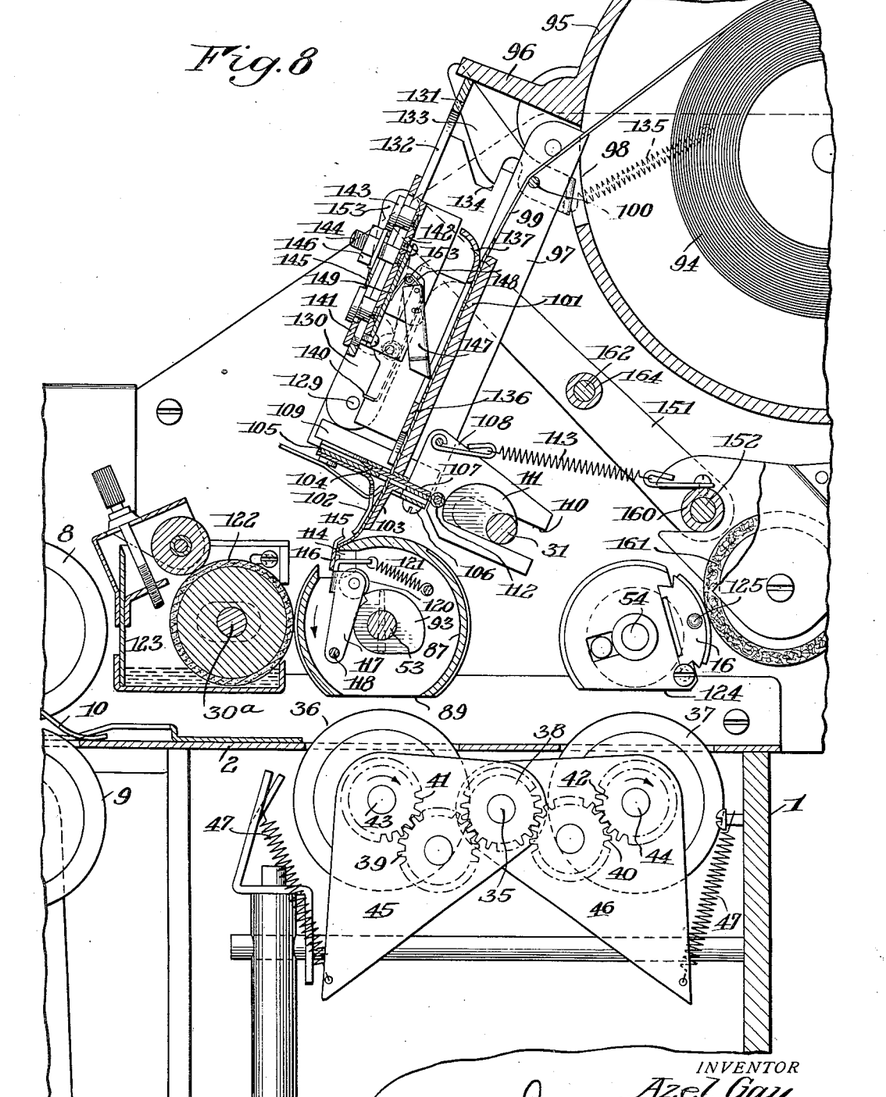
Fig. 8 is a vertical section through the stamp affixing mechanism partly broken away showing the manner in which the stamp, individually, is applied to and received by the stamp affixing roll.
Figure 11:
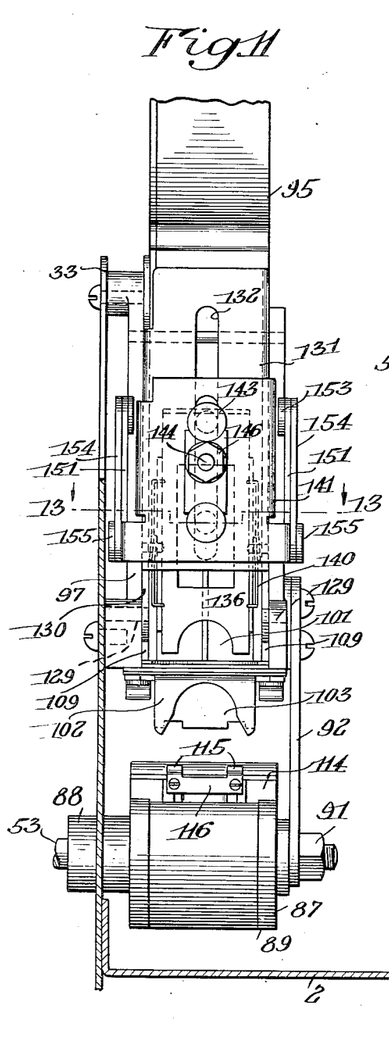
Fig. 11 is a front elevation of the stamp applying mechanism.

Explaining first the purpose of sprocket shaft 35 and referring to Fig. 8, there projects through openings in the table or bed 2 at the delivery end of the machine two platen rolls 36 and 37. The first of these is part of the stamp affixing means while the second is part of the printing means, the two forming in each instance the lower element of the couple. They also act as conveyer rolls that continue the progress of the envelope or letter and finally eject it from the machine, for which purpose they are continuously and positively driven in the following manner:

On the shaft 35 is a gear 38 which, through intermediate gears 39 and 40 meshing with gears 41 and 42 on the shafts 43 and 44 of the platen rolls 36 and 37, drive the latter in unison at the same speed. The roll shaft 43 and the gear 39 are carried by a yoke 45 pivoted on shaft 35 and in like manner intermediate gear 40 and roll shaft 44 are carried on a companion yoke 46 pivoted also on shaft 35. It will thus be seen that both sets of gearing may swing on shaft 35 as a center without disturbing the meshing of the gears. The purpose of this is to allow the platen rolls 36 and 37 to yield downwardly under the pressure of the envelope communicated by the contacts of the stamp affixing and printing elements with which they are respectively coupled, as hereinafter described. Their frictional contact with the under side of the envelope is maintained, however, to the desired degree for propelling purposes by means of springs 47 respectively attached at their ends to a fixed part and to the two yokes 45 and 46.

The cycle member

Figure 22:
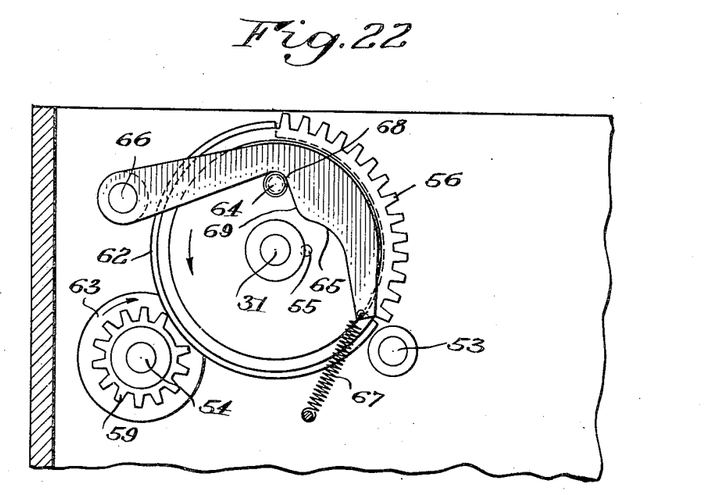
Fig. 22 is a fragmentary sectional view showing in elevation a part of the mechanism whereby a single cycle movement of the printing or pre-cancelling device is effected.

I provide a common central transmission control from the continuously moving driving mechanism, whereby one lift of the trip finger 10 as actuated by the envelope imparts a single rotative movement to the stamp affixer and the printing or cancelling element, both of these being thereafter automatically locked in a normal position of rest. I have called this control the "cycle member" and it is best shown on the sheets containing Figs. 3, 17 and 22. It comprises the shaft 31, on which turns the sprocket 32 driven by the chains aforesaid. The said sprocket, moving continuously, is secured to a clutch element 48 that may be locked with a clutch hub 49 fixed to the shaft through the operation of an intermediate clutch ring 50, the three elements together constituting the familiar type of one-way ball and pocket clutch, indicated in Fig. 18 and which of itself requires no detailed description. It is sufficient to say that, the sprocket 32, rotating counter-clockwise in the direction of the arrow in Fig. 18, tends to lock the clutch members together, while a relative movement of the clutch ring 50 to the right disengages the clutch. On the clutch ring 50 is a shoulder 51 normally engaged by a pawl 52, as in Figs. 17 and 18, which halts the ring, leaving clutch element 49 and the hereinafter described connected parts at rest as well as the shaft 31 to which this element is splined, while companion element 48 and the sprocket continue to turn under their driving connections.

Suitably mounted in bearings in the superstructure are two shafts 53 and 54 paralleling the cycle shaft 31 on either side and below. The first mentioned of these is the shaft of the stamp applying mechanism S and the latter the shaft of the printing element P. Among the several units of the cycle member that turn with the shaft and are locked together by a pin 55 are two segmental or interrupted gears 56 and 57. The former is adapted to mesh with a pinion 58 on the stamp shaft 53 and the latter with a pinion 59 on the printing shaft 54. Through the provision of these two interrupted gears, it is possible to impart one complete rotative movement first to the stamp affixing mechanism and then to the printing mechanism in timed relation upon each single cycle of the cycle member. The said timing allows for the travel of the envelope a sufficient space to bring the cancelling impression upon the previously applied stamp. These two mechanisms will each be described alone under separate heads.

Figure 23:
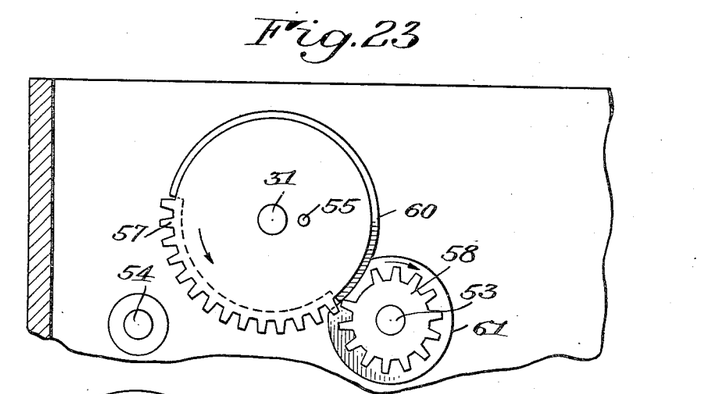
Fig. 23 is a similar view of the same mechanism as that of Fig. 22 taken in another parallel plane.
Figure 24:
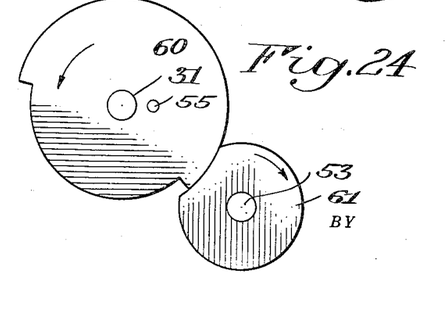
Fig. 24 is a detail of a part of the mechanism shown in Fig. 23, whereby a Geneva stop mechanism is utilized to insure the proper operation of the mutilated gearing shown in Figs. 22 and 23 to accomplish the single cycle of the printing operation furthered by the mechanisms of Figs. 22 and 23.

A Geneva stop movement is employed to lock each of the shafts 53 and 54 against further movement or lost motion upon the completion of each single rotation of the cycle member and a description of one will suffice for both. Fig. 24 shows that one which is associated with the stamp shaft, 60 indicating a disk on the cycle shaft 31 having an interrupted periphery otherwise fitting and running in engagement with the curvature of the reentrant segment of a disk 61 secured to the stamp shaft gear 58. The corresponding elements for the printing shaft coacting in the same manner are indicated at 62 and 63 respectively. Also in this connection, to make sure that the cycle element comes to a stop accurately at an exact point without rebound, for instance, I provide (Fig. 22) on the lateral face of segmental gear 56 a pin 64, upon which rides a cam lever 65 pivoted to the frame at 66 and held to the pin by a spring 67. In the stop position of the figure referred to, the pin occupies a depressed portion 68 of the cam lever adjacent to a steep portion 69 thereof. The latter, under the spring pressure of the lever, is sufficient to urge the cycle member to its true normal position and bring the gearing, as for instance in Fig. 23, into proper position to mesh in synchrony.

The trip mechanism

Figures 3, 10:
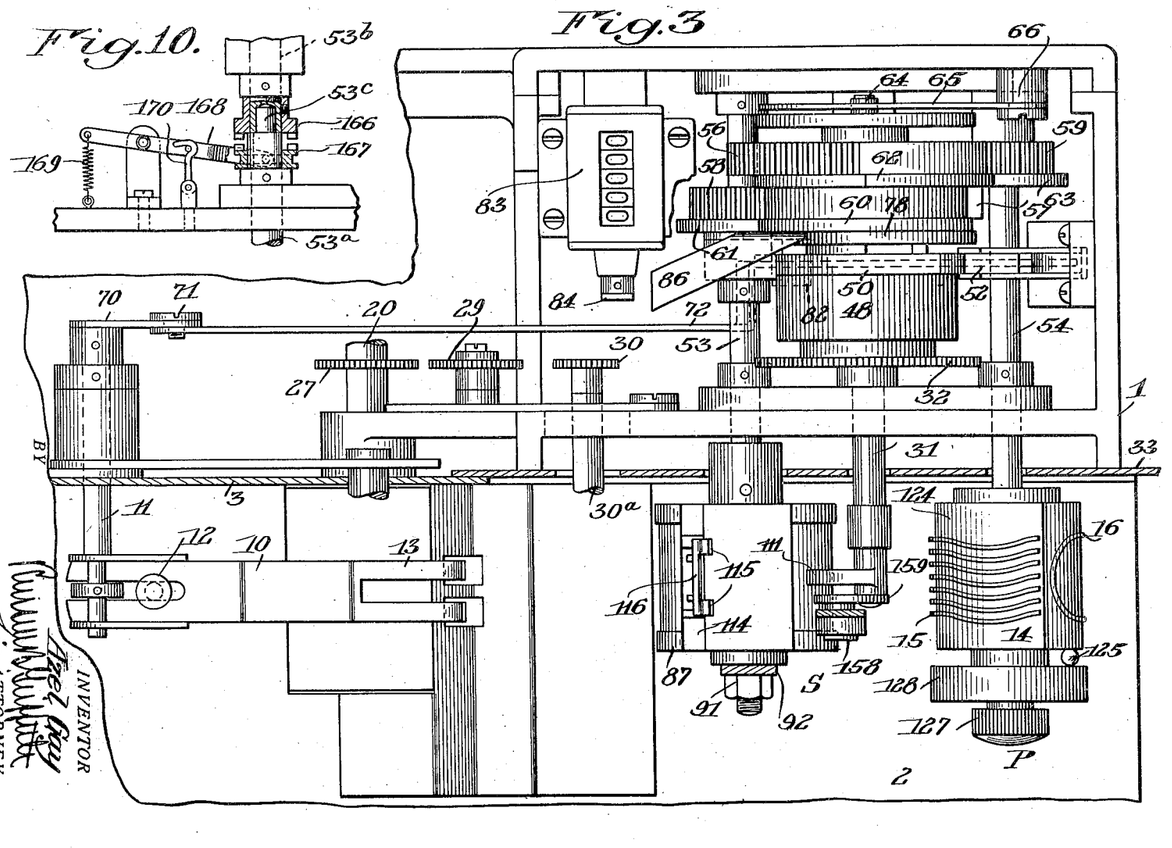
Fig. 3 is a top plan view of the moving parts of the apparatus taken in horizontal section through the frame thereof.
Fig. 10 is a fragmentary detail top view, partly in section, of a clutch mechanism for the stamp affixing mechanism.
Figure 20:
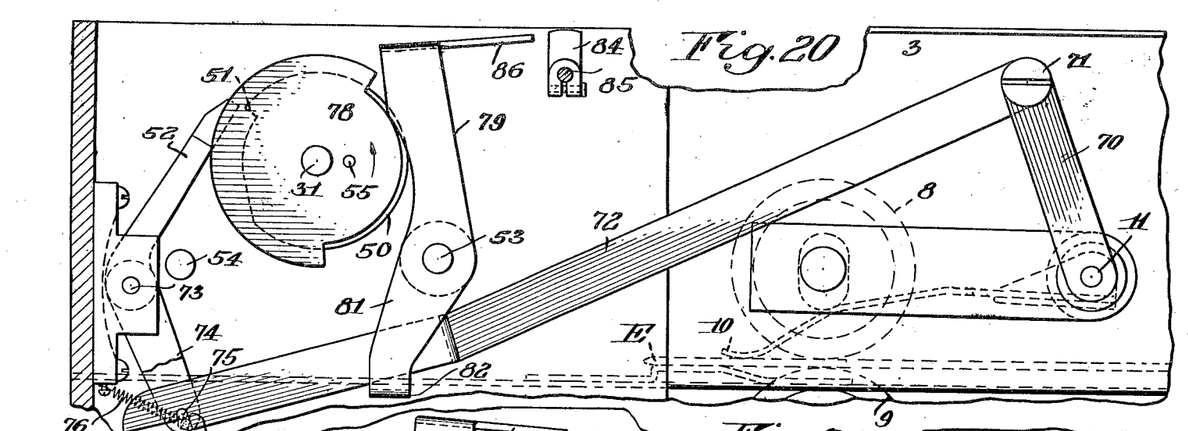
Fig. 20 is a fragmentary partially sectional view showing the parts of the one cycle control of the precancelling or permit elements in one position.
Figure 21:
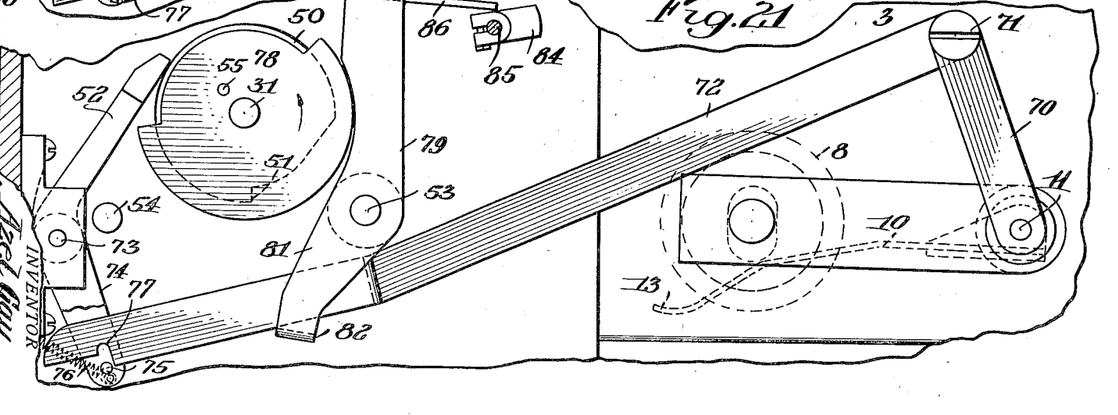
Fig. 21 is a view similar to Fig. 20 showing the same parts in another position.

It has been described that the successively intermittent stamp affixed and printing rotations of the cycle element on shaft 31 are controlled, or brought about rather, by the passage of the envelope E under the trip finger 10. Referring still to Figs. 3 and 17 and additionally to Figs. 20 and 21, the connecting mechanism for this purpose comprises a crank arm 70 on the rear end of the rock shaft 11 of finger 10, to the upper end of which is pivoted at 71 one end of a latch arm 72. The stop pawl 52, above described in connection with the cycle member, is pivoted at 73 in a bracket on the frame and a lower arm 74 thereof is provided with a laterally projecting pin 75. Also attached to this arm is a spring 76, the tendency of which is to hold the pawl 52 in engagement with the shoulder 51 of the clutch ring 50, maintaining the clutch out of action and the cycle element stationary. This normal position is that of Fig. 17.

At the far end of the latch 72 is a notch 77 normally engaged by gravity with pin 75, as shown. When the envelope or letter trips the finger 10, the crank arm 70 draws the latch 72 to the right in the figures, disengaging pawl 52, as in Fig. 20. The clutch elements on shaft 31 immediately lock and the cycle member starts to rotate, the pawl riding on the periphery of clutch ring 50 and again locking against the shoulder upon the completion of the rotation to disengage the clutch again ready for another cycle of movement. To positively hold the pawl 52 out of engagement with the clutch ring during the cycle, there is secured on the shaft 31 as an element of the cycle member a cam 78, which engages an arm 79 of a lever pivoted at 53, the other arm 81 of which is provided with a hook 82 disposed beneath the latch bar 72. This raises the latter and holds it raised out of the path of pin 75 on pawl 52 for the cycle period during which the said arm 72 dwells on the high point of cam 78. By the time the shoulder 51 of the clutch ring reaches the stopping point or just before and pawl 52 drops into the depression adjacent thereto in normal position, arm 79 drops off of the high point of cam 78, releasing latch bar 72 and allowing the notch 77 to drop back upon the pin 75 of the pawl, thus restoring the original and normal positions of all parts.

It will be seen from this construction that even though the finger 10 is forciby held up or becomes caught and is so maintained for a period, there will still result but one cycle of the shaft 31 and the cycle member and one operation each of the stamp affixer S and the printing element P.

The operations of the machine, that is, each revolution of the cycle member, are registered upon a counter that may be of conventional type, as indicated at 83 in Fig. 3. An operating arm 84 on the shaft 85 of this counter comes in the path of an offset finger 86 extending from lever 79. Upon each cycle and as the said lever raises the latch 72 under the influence of cam 78, this finger 86 rocks arm 84 of the counter from the position of the other figures to that of Fig. 21 and advances the register.

Stamp affixing mechanism

Figure 12:
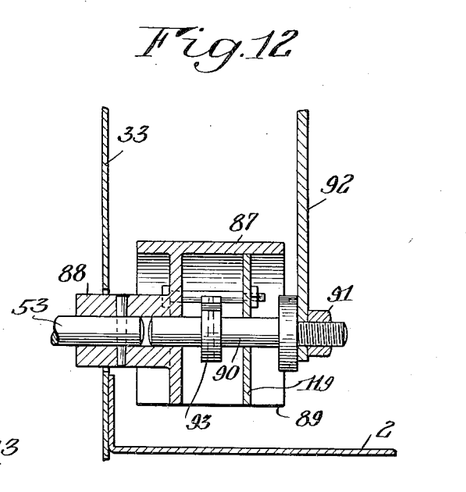
Fig. 12 is a sectional view of the stamp applying drum in detail.

Referring now more particularly to the sheets containing Figs. 5, 8, 11, and 14, the stamp affixing element, proper, consists of a hollow metal drum 87 having a hub 88 pinned to shaft 53, best shown in Fig. 12. The major portion of its periphery is adapted to come into rolling contact with the under platen 36, before described, but a portion of it is faced off or flattened as at 89 by removing a segment, so that in the normal position of Figs. 8 and 14, for instance, a free space is provided between it and the said platen. By means of a male and female clutch on shaft 53, indicated generally at 89ª and shown in detail in Fig. 10, the stamp affixing mechanism can be thrown out of operation entirely at will, at which time the drum maintains the position just described allowing the machine to be used for sealing only; for printing only; or for sealing and printing without stamp affixing. Conversely, the other two instrumentalities can be thrown out of gear and the machine used for stamp affixing only. The sealing operating is omitted through simply removing the supply of water and the printing operation, as will be hereinafter described.

The hub 88 of the stamp drum is also journalled on a stud 90 secured by a nut 91 to a fixed extension 92 of the stamp guide hereinafter described. It carries within the drum a fixed cam 93, the purpose of which is to actuate the stamp gripping device and will be hereinafter referred to.

The stamps are prepared in a rolled strip 94 which is contained within a circular locked casing 95 mounted at an elevated point on the superstructure 33 of the frame. Also secured to the latter and to an extension 96 of the casting of casing 95 is an inclined stamp guide frame 97 running from an opening 98 in casing 95 down to the vicinity of the stamp drum 87. The strip of stamps is fed, one stamp length at a time, as indicated at 99, from the roll 94 through aperture 98 over a guide rod 100 down the face of the bottom plate 101 of the guide 97, which forms a run-way, and out at the bottom of the guide between throat pieces 102 and 103 that support the end of the strip and the end stamp in the position of Figs. 8 and 14 in contact with the periphery of the stamp affixing drum. The positions of the parts in the figures referred to are the normal positions that they occupy during the period of rest when the cycle member is disconnected and the drum is locked.

Figures 5, 9:
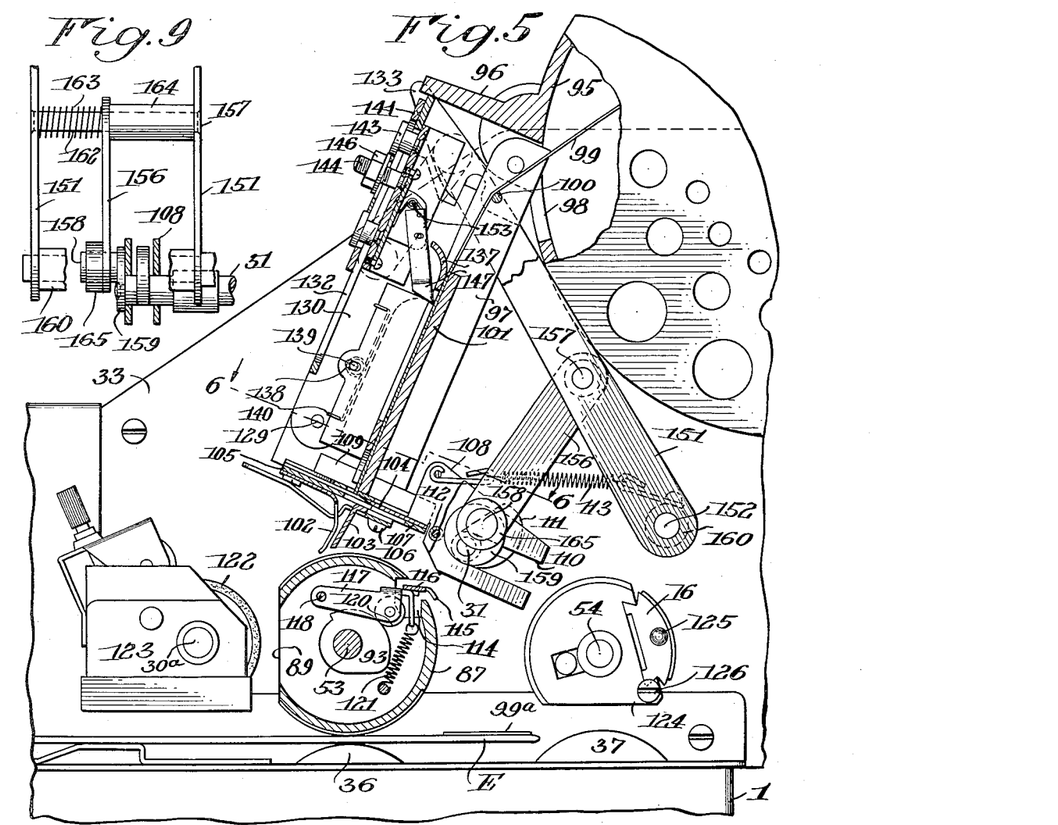
Fig. 5 is a general view, partly in vertical section, of the stamp affixing mechanism of the mailing machine.
Fig. 9 is a view taken from the rear of Fig. 8 showing the manner in which the stamp affixing mechanism is cut out in case it is desired to use the stamp printing permit independently of the stamp affixing and precancelling mechanism.
Figure 6:
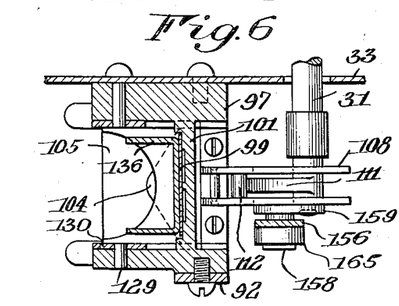
Fig. 6 is a detailed section on the line 6—6 of Fig. 5 showing the parts in one position.
Figure 7:
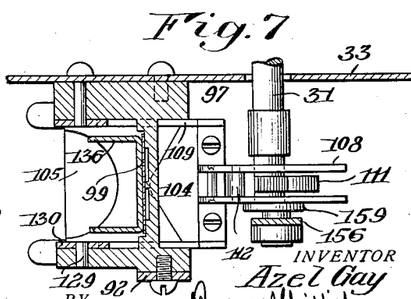
Fig. 7 is a view similar to Fig. 6 on the same section showing the parts in position occupied during a different phase of the cycle.

In the meantime, however, the severing device has operated to cut off the end stamp. This consists, in the present instance, of a reciprocatory knife 104 operating in a guide 105 extending transversely of the stamp run-way at the bottom of the stamp guide frame, said knife being secured at 106 to a cross piece 107 on a carriage 108 provided with forward extensions 109 at each side also guided between the side walls of the stamp guide frame. The rear end of this carriage, which is in the form of a yoke, is bifurcated at 110 to embrace the cycle shaft 31 which projects through the frame wall at this point. This shaft has fixed thereto a cam 111 that cooperates with a transverse roller 112 on the knife carriage. As it appears in the normal position of Fig. 8, said roller is on the high point of the cam, the stamp has been severed and the knife is fully projected in its guide at the end of its stroke. During the ensuing cycle, the carriage and knife ride down to the low point of the cam and the knife is fully retracted under the influence of the spring 113 attached to a fixed part, as shown in Fig. 5.

Figure 14:
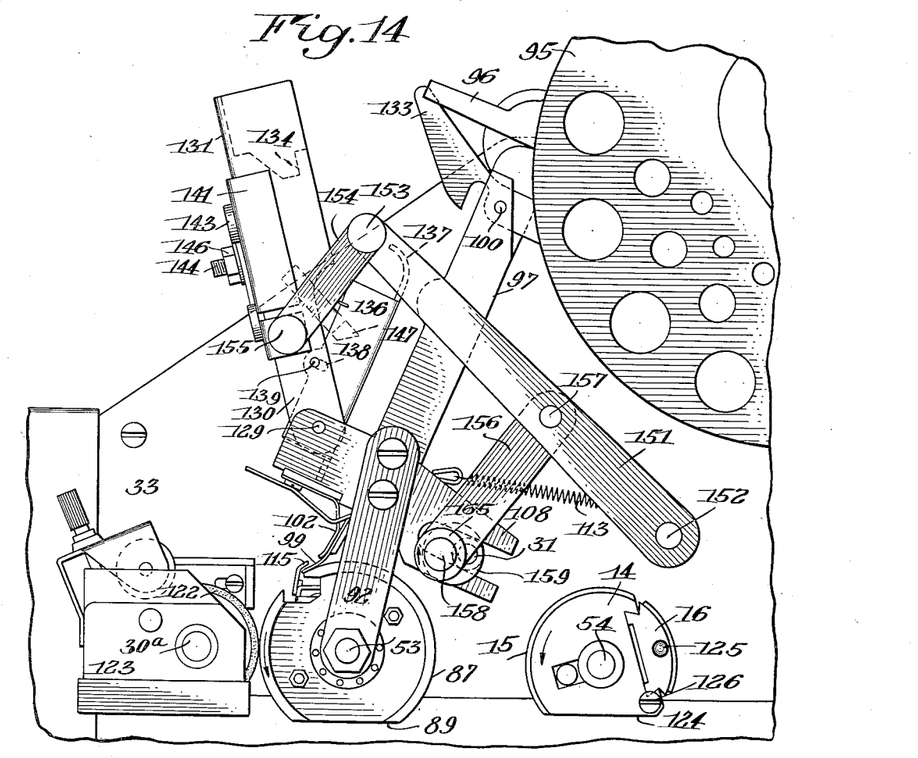
Fig. 14 is an elevation, viewed from the front, of the stamp applying mechanism opened showing the stamp feeding mechanism in inoperative position.

Reverting to the subject of the contact of the lower end of the severed stamp with the stamp drum 87, as in Figs. 8 and 14, there is an opening 114 in the periphery of the drum through which project a pair of very small fingers 115 and the corners of the stamp are presented against and beneath these fingers or between them and the adjacent portion of the drum surface. These fingers are on a bar 116 secured to the cross-piece of a yoke 117, arms of which are pivoted at 118 between webs 119 within the drum. Carried between the arms of the yoke is a roller 120 that rides on the stationary cam 93 before described against which it is held by a spring 121 connected to an extension of the yoke and to the web of the drum.

Figure 15:
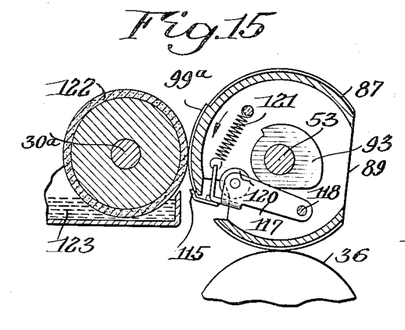
Fig. 15 is a detail fragmentary section showing the manner in which the stamp receiving and applying drum cooperates with the moistening devices at the time that the stamp is initially picked up by the drum.

Upon the start of a cycle of operation, the first thing that happens, so far as the stamp affixing drum is concerned, is that the roller 120 drops down to the low point of the cam 93 and the spring 121 causes the fingers 115 to grip the corners of the stamp. There is just a slight movement of the drum from the position of Fig. 8 before the fingers actually press upon the stamp, so that they cover as little of its gummed surface (which is outermost in the figure) as possible and yet hold it securely. As the drum continues in the direction of the arrow, the gripped stamp is laid along its periphery and next comes in contact with a moistening roll 122 located in a suitable water reservoir 123 and projecting through an opening therein into tangential relationship with the drum, all as shown in Fig. 15, in which the stamp itself is indicated at 99ª. The moistening roll 122 may be driven or idle but, in the present instance, it is shown mounted on the front end of the same shaft 30ª that carries the sprocket 30 driven by the sprocket chain 38 (Fig. 17).

Figure 16:
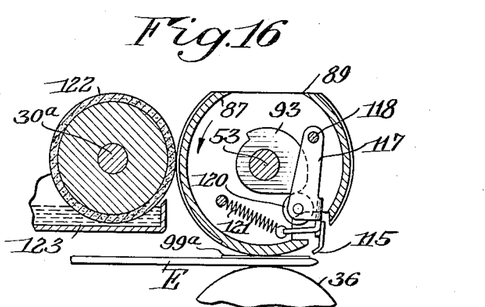
Fig. 16 is a view similar to Fig. 15 showing the positions of the same parts after the stamp is applied to the envelop after the latter has travelled under the said stamp affixing drum.

By this time, the rolls 8 and 9 have advanced the envelope between the drum 87 and its platen roll 36, as shown in Fig. 16 and the moistened stamp 99ª is laid upon its corner and pressed upon its surface by the pressure of the platen with a rolling contact. As soon as this contact is established, the roller 120 reaches a high point of the stationary cam 93 releasing the gripping fingers 115 which remain in raised position, as shown in Fig. 5, until the original position of Figs. 9 and 14 is reassumed ready for the next operation. The stamp affixing couple advances the envelope along its course and delivers it from the machine if the printing mechanism P is not in use, or if the latter is in use, presents the envelope to the latter for projection by it from the machine.

*Printing operation*

Before continuing the subject of this stamp affixing mechanism to the point of describing the mechanism employed for feeding the stamps and attendant features, it will be best to follow the rest of the course of the envelope and describe the printing device P, which is very simple.

Referring to Figs. 1, 3 and 5, the before described shaft 54 rotated at the proper interval after the operation of the stamp affixer also projects through the frame plate 33 and carries at its end a printing cylinder 14 on which is the cancelling die 15 and the postmarking die 16, referred to earlier in the description. As the date has to be changed daily on the postmarking die 16, this is made endwise removable and replaceable in the usual manner with a pull-out knob 125 and a locking screw 126. The whole cylinder is also removable and replaceable, being held in position by a thumbnut 127. Between the thumb nut and the cylinder is an envelope feed roll 128, which makes a more positive frictional contact than the dies alone could do and prevents the latter from smearing. The printing cylinder 14 is also faced off at 124 on its under side by the removal of a segment thereof, so that it will normally, as in Figs. 5 and 14, offer a space between it and its platen 37 for the free passage of the envelope or letter E up to the point that the cancelling die 15 makes contact with the stamp 99ª which, of course, occurs first, the postmarking die 16 following it around and impressing the envelope beyond the cancellation mark.

To throw out the printing operation, the printing drum is simply removed altogether. If desired, of course, a permit die may be substituted for the cancelling and postmarking dies to utilize some of the benefits and advantages to be derived from the machine as a whole, but even with the removal of the printing dies or printing cylinder, the frictional feed roll 128 is replaced and is still necessarily utilized to give the final feed to the envelope and kick it out of the machine.

Stamp feeding mechanism

Pivoted at 129 by means of side flanges 130 to the inner wall faces of the stamp guide 97 to normally lie in spaced relation to the bottom guide wall 101 is a plate 131 slotted at 132. It is maintained in this normal position of Fig. 8, for instance, by latch 133 pivoted on the stamp roll housing and engaging a shoulder 134 on one of said flanges 130, said latch being actuated by spring 135. This pivoted plate carries the feeding mechanism and may be thrown out to the position of Fig. 14 by releasing the latch 133 for the purpose of cleaning the guide 97 and threading the stamp strip 99 therethrough.

A presser foot 136 engages the stamp strip 99 to hold it flat and evenly against the back plate 101 of the guide, being provided with a curved upper end 137 to help the stamp strip move smoothly thereunder. It is channel-shaped and its side flanges are slotted at 138 to take a slidable pivotal bearing on pins 139 on the flanges 130 of the top plate 131. It may thus yield and adjust itself under the tension of suitable springs 140. Reciprocatable on the plate 131 is a feed carriage composed of a U-shaped plate 141 embracing the outside thereof and a U-shaped plate or channel bracket 142 on the inside (see particularly Figs. 8 and 13). These are connected together by headed guide pins 143 working in the slot 132 but more particularly by a threaded bolt 144 fixed to the inner element 142 and extending through the same slot and also through a slotted plate 145, against which the adjusting nut 146 bears. This plate 145 is secured or, rather, held between the guide pins, so that by loosening the nut, the inner member 142 of the carriage, which actually carries the feed fingers, may be adjusted relatively to the outer member 141 to control the exact point at which the feed fingers engage the stamp strip at the start of their hereinafter described movement which is of uniform amplitude, namely, somewhat in excess of the width of one stamp.

Figure 13:
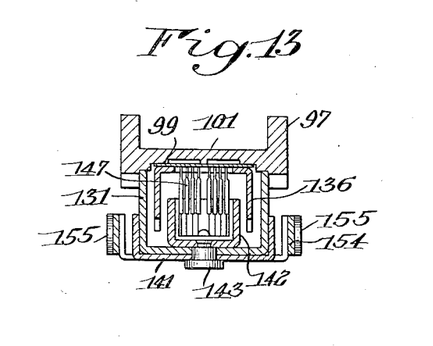
Fig. 13 is a section taken on the line 13—13 of Fig. 11 of the stamp feeding mechanism.

These feed fingers are indicated at 147 (see also Fig. 13). They are of the pointed form shown to engage in the perforations of the stamp strip 99 between the stamps. Although there are eleven perforations, a less number of feed fingers is sufficient for positive engagement with the strip without danger of mutilation and, in the present instance, I have shown six. They are all pivoted at 148 between the wings of a bracket 149 secured to the inner member 142 and are pressed against the stamp strip by springs 150 encircling the pivot. Their action is to yieldingly slide up the gummed surface of one stamp section of the strip, engage themselves respectively with a line of transverse perforations in the strip and then move downwardly one stamp length, which is reflected in the feed below to the knife 104 and the gripping fingers 115 on the affixing drum. The reciprocatory travel of the feeding fingers is purposely made greater than the width of the postage stamp or label to be fed. The feeding fingers in their upward stroke slide over the surface of the stamp strip to a point somewhat beyond the next row of perforations. On the downward or feeding stroke, the fingers do not move the stamp until their ends engage the perforations. Thus, while the actual reciprocatory movement of the fingers is constant, the actual feeding movement of the stamps is based on the distance between perforations. This enables the stamp feeding mechanism to be self-correcting for different widths of stamps. While the point of start of movement of the stamp strip, when the fingers are once locked in the perforations, will vary according to distances between perforations, as hereinbefore described, the stopping point, or finish, of the reciprocating feeding movement of both strip and fingers is always at the same point, that is, the average width of one stamp between it and the cutoff knife. The adjustment obtainable with the bolt 144 permits regulating this distance for stamps of foreign countries or for label affixing, so that stamps or labels of different widths may be accurately fed, severed, and affixed by the machine, simply by making the adjustment provided by bolt 144. It may be here noted that even on a single strip of stamps of a given intended width, mistakes are made in perforating that occasionally results in greater or less distance between succeeding lines of perforations defining some single stamp width or area. Hence, the fine adjustment with the bolt 144.

The actuating mechanism for bringing about the reciprocations of the feed carriage 141 carrying the feed fingers in timed relation to the operations and movements of the other parts hereinbefore described is, in the present instance, as follows:

A rock arm 151 pivoted to the machine frame at 152 is pivoted at its upper end at 153 to a link 154 pivoted at 155 to the carriage 141. It will be seen that uniform vibration of this lever will uniformly reciprocate the carriage carrying the feed fingers in the intended manner. Such movement is communicated to it through a connecting rod 156 pivoted to the rock arm 151 at 157 at its upper end and having a wrist pin connection at 158 at its lower end with an eccentric disk 159 on the cycle shaft 31 which also projects through the frame plate 33. By this simple connection and direct connection, a proper timed actuation of the feed carriage and feed fingers is assured upon each cycle of movement. Also, the connection with the feed carriage through link 154 does not interfere with but permits the opening of the stamp guide by swinging out the plate 131, as in Fig. 14.

The statement was omitted that the rock arm and link connections 151 are duplicated on the two sides of the feed guide in the form of a yoke, as shown in Figs. 4 and 9, and what was termed a pivot 152 is really a stud of some length. The arms are connected by a sleeve 160 on the stud, and incidentally the inking roll 161 for the printing cylinder 14 is positioned in connection with this sleeve, as indicated, but as this inking roll may be of any desired construction, so far as the invention herein involved is concerned, no further description is necessary.

As heretofore stated, the stamp affixing mechanism can be thrown out of operation, the stamp drum 87 remaining in the neutral position of Figs. 8 and 14, in which case the feeding of the stamp strip must be discontinued. This is accomplished, in the present instance, by pivoting the connecting rod 156 on a rod 162 connecting the rock arms 151 of the yoke. It is held in position at its upper end by a spring 163 (Fig. 9) that presses it against a shoulder provided by the end of a sleeve 164 on the rod. The attachment of the connecting rod to the wrist pin 158 at its lower end is a free one, that is, the hub bearing 165 on the wrist pin may be slipped off. Thus, by compressing the spring 163 and moving the connecting rod to the left in Fig. 9 on the rod 162, all driving connection from cycle shaft 31 is broken, the wrist pin turning idly and the entire feeding mechanism remaining at rest.

Of course, the stamp affixing mechanism can be rendered inoperative in another way, that is by omitting to place any stamps in the feeding mechanism, but the last described construction is preferable, as it prevents useless wear on the feeding parts running idly. To maintain the stamp affixing drum 87 at rest, the simple clutch mechanism illustrated in Fig. 10 may be utilized, which mechanism has been omitted from the general views in order not to complicate them. The shaft 53 is made in two parts 53ª and 53ᵇ, the former of which may turn in a bore in the other at 53ᶜ. They are respectively equipped with clutch elements 166 and 167, the former of which is fixed and the latter splined to slide into and out of engagement therewith by the use of a shipper 168 normally actuated to hold the clutch and the two shaft sections locked by a spring 169. A latch 170 may be hooked over a pin on the shipper, as shown, to hold the sliding clutch retracted against the tension of the spring, so that section 53ª of the shaft carrying the affixing drum 87 becomes idle.

It will be remembered that during the description of the envelope trip in connection with the cycle member, it was pointed out that the latter made but one cycle resulting in single operations only of both the stamp affixer and the printing means upon lifting the trip regardless of how long the trip remained so raised. From this it is clear that both of the instrumentalities named can be rendered ineffective for the purpose of using the machine as an envelope sealer only by holding the trip 10 for the period desired in its elevated position. This again explains the reason for providing the flattened faces on both the affixer drum and the type cylinder, resulting in the normal spacing of these from their platen elements.

I claim as my invention:

1. In a mail handling machine, the combination with envelope feeding means and a stamp affixing element and a printing element associated therewith, of a cycle member having a direct driving connection with both of said elements to operate them in succession.

2. In a mail handling machine, the combination with envelope feeding means and a stamp affixing element and a printing element associated therewith, of a cycle member having a direct driving connection with both of said elements to operate them in succession, and means tripped by an envelope passing through the feeding means for imparting a single rotation to the cycle member.

3. In a mail handling machine, the combination with envelope feeding means and a stamp affixing element and a printing element associated therewith, of a cycle member having a direct driving connection with both of said elements to operate them in succession, and means for positively locking both the stamp affixing element and the printing element in normal position when idle.

4. In a mail handling machine, the combination with envelope feeding means and a stamp affixing element and a printing element associated therewith, of a cycle member having a direct driving connection with both of said elements to operate them in succession, and means for centering the cycle member accurately in its normal position of rest.

5. In a mail handling machine, the combination with envelope feeding means and a stamp affixing element and a printing element associated therewith, of a cycle member having a direct driving connection with both of said elements to operate them in succession, means tripped by an envelope passing through the feeding means for imparting a single rotation to the cycle member, and means for centering the cycle member accurately in its normal position of rest embodying a projection on the cycle member and a cam lever riding thereon and having a centering depression and a spring connected to the cam lever.

6. In a mail handling machine, the combination with envelope feeding means and a stamp affixing element and a printing element associated therewith, of a cycle member having a direct driving connection with both of said elements to operate them in succession, and means for positively locking both the stamp affixing element and the printing element in normal position when idle embodying Geneva stops, the elements of which in each case are carried respectively by the cycle member and one of said elements.

7. In a mail handling machine, the combination with envelope feeding means, a rotary stamp affixing element, and a rotary printing element associated therewith, of a rotary cycle element arranged intermediately of the axes of rotation of said elements and adapted to rotate them each once successively upon a single rotation of the cycle member.

8. In a mail handling machine, the combination with envelope feeding means, of a pair of parallel shafts projecting adjacent to the path of travel of the envelope and respectively carrying rotary stamp affixing and printing elements, pinions on said shafts, and an intermediate rotary cycle member having segmental gears thereon meshing with the respective pinions to impart a single rotation to each shaft successively during one complete rotation of the cycle member.

9. In a mail handling machine, the combination with envelope feeding means, and rotary stamp affixing and printing elements associated therewith, of a cycle element geared to operate each of said elements once upon a single rotation of its own embodying a normally idle shaft, a clutch element turning freely thereon, means for driving the same continuously, a one-way driven clutch element cooperating with the driving clutch, a clutch releasing member rotating with the clutch elements when interlocked, a stop normally holding the clutch releasing element, a trip actuated by the passing of the envelope connected to release the stop, and means for holding the stop released during one rotation only of the cycle member.

10. In a mail handling machine, the combination with an envelope feeding means and a rotary element adapted to function upon the surface of an envelope passing therethrough, of driving means, a cycle member having a one-way clutch connection with said driving means and adapted to rotate the rotary element once upon each single rotation of its own, a normally engaged stop for holding the clutch out, a trip actuated by the envelope passing through the feeding means, a displaceable connection between the trip and the stop for moving the latter to inoperative position, and a detent controlled by the cycle member for holding the connection displaced during a full rotation of the cycle member.

11. In a mail handling machine, the combination with an envelope feeding means and a rotary element adapted to function upon the surface of an envelope passing therethrough, of driving means, a cycle member having a one-way clutch connection with said driving means and adapted to rotate the rotary element once upon each single rotation of its own, a normally engaged stop for holding the clutch out, a trip actuated by the envelope passing through the feeding means, a displaceable connection between the trip and the stop for moving the latter to inoperative position, a detent controlled by the cycle member for holding the connection displaced during a full rotation of the cycle member, a registering counter, and an operating member therefor actuated by the detent upon each revolution of the cycle member.

12. In a mail handling machine, the combination with an envelope feeding means and a rotary element adapted to function upon the surface of an envelope passing therethrough, of driving means, a cycle member having a one-way clutch connection with said driving means and adapted to rotate the rotary element once upon each single rotation of its own, a normally engaged stop for holding the clutch out, a trip actuated by the envelope passing through the feeding means and provided with a crank arm, a link connected to the crank and having a displaceable connection with the stop to retract the same, a cam on the cycle member, and a detent actuated thereby to disconnect the link and stop upon operation of the trip and to hold the link disconnected during one rotation of the cycle member.

13. In a mail handling machine, the combination with a motor and a pair of envelope feeding rolls, one of which embodies a shaft driven from the motor and provided with a sprocket, a rotary element adapted to function upon the surface of an envelope passing therethrough, a cycle member having a one-way clutch connection and adapted to rotate the rotary element once upon each single rotation of its own, a driven element provided with a sprocket and cooperating with the said clutch connection to move selectively with and relatively to it, a normally engaged stop for holding the clutch connection out, and a trip actuated by the envelope passing through the feed rolls and connected to the stop to retract the same, of a shaft provided with a sprocket and with a rotary platen cooperating with the first mentioned rotary element, and a sprocket chain running over all of the beforementioned sprockets.

14. In a mail handling machine, the combination with an envelope feeding means, of a cylindrical rotary element adapted to function upon the surface of an envelope, on the one hand, and a platen, on the other hand, adapted to receive the envelope between the two, the said rotary element being cut back on one side to interrupt its cooperation with the platen and provide a substantial spaced relationship between them at a given point to permit the free passage of an envelope between them, means for intermittently driving the rotary element, and means for halting it at the point in spaced relationship to the platen at the end of each revolution to permit the idle passage of the envelope therethrough.

15. In a mail handling machine, the combination with an envelope feeding means, of a rotary stamp affixing drum and a rotary printing cylinder arranged in spaced relationship along the path of travel of the envelope, each being cut back on one side, a pair of platens cooperating respectively with the drum and cylinder in tangential relationship except when the cut-back portion comes opposite thereto leaving space between at a given point for the free passage of an envelope, means for intermittently driving the drum and cylinder, and means for halting them in the said spaced relationship to their respective platens.

16. In a mail handling machine, the combination with an envelope feeding means, of a rotary stamp affixing drum and a rotary printing cylinder arranged in spaced relationship along the path of travel of the envelope, each being cut back on one side, a pair of platens cooperating respectively with the drum and cylinder in tangential relationship except when the cut-back portion comes opposite thereto leaving space between at a given point for the free passage of an envelope, means for intermittently driving the drum and cylinder, means for halting them in the said spaced relationship to their respective platens in a normal position of rest, and means for disconnecting the driving connection to one of said rotary elements.

17. In a mail handling machine, the combination with an envelope feeding device, a rotary stamp affixing drum and a rotary printing cylinder arranged in spaced relationship along the path of an envelope, of a pair of platen rolls respectively cooperating with said drum and cylinder, a driving gear arranged between the platens and yielding supports for the latter in which they have their bearings comprising spring actuated frames pivoted on the gear center and carrying gearing meshing with said gear and adapted to turn the platen rolls in any position of the supports.

18. In a mail handling machine, the combination with envelope feeding devices, of a rotary stamp affixing drum associated therewith having a stamp gripping device on its periphery, means for intermittently rotating the drum and halting it with the gripping device in the same normal position, means synchronized with the rotation of the drum for feeding the end stamp of a strip of stamps to the gripping device while at rest, and means for severing said stamp.

19. In a mail handling machine, the combination with envelope feeding devices, of a rotary stamp affixing drum associated therewith having an opening therein, an arm pivoted within the drum and having fingers projecting through the opening to grip the advance edge of a stamp against the periphery of the drum, and a fixed cam within the drum for opening and closing the gripping fingers at predetermined points in the rotation of the drum.

20. In a mail handling machine, the combination with envelope feeding devices, of a rotary stamp affixing drum associated therewith having an opening in its periphery, a gripping device within the drum embodying normally released gripping fingers extending through the opening, means for intermittently rotating the drum, means for feeding a stamp to the gripping fingers when the drum is in a normal position of rest, and means within the drum for actuating the fingers to grip the edge of the stamp upon the initial movement of the drum and operating to release the fingers while said stamp is in contact with the envelope and with a surface of the drum.

21. In a mail handling machine, the combination with envelope feeding devices, of a rotary stamp affixing drum associated therewith having an opening in its periphery and provided with a hub, a gripping device within the drum embodying gripping fingers extending through the opening to engage the edge of a stamp, a driving shaft secured in the hub, and a fixed stud shaft extending through the drum and upon which the hub has a bearing, said stud shaft being provided with means for actuating the gripping device.

22. In a mail handling machine, the combination with envelope feeding devices, of a rotary stamp affixing drum associated therewith having a stamp gripping device on its periphery, means for intermittently rotating the drum, means within the drum for opening and closing the gripping device and maintaining it open while the drum is in a normal position of rest, means for feeding the end stamp of a strip of stamps to the gripping device while at rest, and synchronized means for severing said stamp at the end of a revolution of the drum, the feeding device being timed to advance the stamp strip during the revolution of the drum.

23. In a mail handling machine, the combination with an envelope feeding device, of a rotary stamp affixing drum associated therewith having a stamp gripping device on its periphery, a cycle member connected to intermittently rotate the drum, means tripped by the passage of an envelope through the feeding device for communicating a single rotation to the cycle member and through it to the drum, means for feeding the end stamp of a strip of stamps to the gripping device at the end of a rotation of the drum, a knife for severing said end stamp, and means on the cycle member for effecting synchronized actuation of the strip feeding means and the knife with reference to the actuations of the drum.

24. In a mail handling machine, the combination with an envelope feeding device, of a rotary stamp affixing drum associated therewith having a stamp gripping device on its periphery, a cycle member connected to intermittently rotate the drum, a stamp strip guide, means embodying a rock arm for feeding the end stamp of a strip of stamps to the gripping device at the end of a rotation of the drum, a severing device embodying a knife and a reciprocatory carriage for cutting off said end stamp at the conclusion of a rotation of the drum, a shaft for the cycle member, a cam on said shaft for reciprocating the knife carriage, a crank thereon, and a connecting rod connecting the crank and the rock arm of the stamp feeding means.

25. In a mail handling machine, the combination with envelope feeding means, of a stamp affixing drum associated therewith having stamp gripping fingers on its periphery, means for intermittently rotating the drum, means for actuating the gripping fingers and adapted to hold them open when drum is at rest, a stamp strip reel arranged above the drum and beyond it in the direction of travel of the envelope, a stamp guide extending angularly from the region of the drum and having a delivery point substantially tangential to the rear side of the drum, means associated with the stamp guide for feeding the end stamp of the strip to the gripping device at the end of rotation of the drum as the gripping device comes to rest, and means for severing said end stamp.

26. In a mail handling machine, the combination with a stamp affixing element, means for supporting a stamp strip, and a stamp guide extending between the two, of a reciprocatory carriage associated with the guide, a plurality of feeding fingers bodily adjustably mounted on the carriage and adapted to engage the perforations of the stamp strip and means for fastening the feeding fingers in different positions of adjustment on the carriage.

27. In a mail handling machine, the combination with a stamp affixing element, means for supporting a stamp strip, and a stamp guide extending between the two, of a reciprocatory carriage associated with the guide, a plurality of feeding fingers adjustably mounted on the carriage and adapted to engage the perforations of the stamp strip, a rock arm connected to actuate the carriage, a driving shaft for the stamp affixing element, and a crank and pitman connecting the shaft and rock arm.

28. In a mail handling machine, the combination with a stamp affixing element, means for supporting a stamp strip, and a stamp guide extending between the two, of a cover plate pivoted to said guide, a carriage reciprocatable on the cover plate, and feeding fingers on the carriage adapted to engage perforations in the stamp strip to advance the same on the reciprocations of the carriage, said cover plate being adapted to be swung out on its pivot to afford access to the stamp guide.

29. In a mail handling machine, the combination with a stamp affixing element, means for supporting a stamp strip, and a stamp guide extending between the two, of a cover plate pivoted to said guide, a carriage reciprocatable on the cover plate, feeding fingers on the carriage adapted to engage perforations in the stamp strip to advance the same on the reciprocations of the carriage, said cover plate being adapted to be swung out on its pivot to afford access to the stamp guide, and a rock arm having a link connection to the carriage to actuate the same and remain attached thereto in either position of the cover plate.

30. In a mail handling machine, the combination with a stamp affixing element, means for supporting a stamp strip, and a stamp guide extending between the two of a cover plate pivoted to said guide, a carriage reciprocatable on the cover plate, a presser foot also mounted on the cover plate to flatten the stamp strip as it proceeds through its guide, and feeding fingers on the carriage adapted to engage perforations in the stamp strip to advance the same on the reciprocations of the carriage, said cover plate being adapted to be swung out on its pivot carrying the presser foot and fingers with it to afford access to the stamp guide.

31. In a mail handling machine, the combination with a stamp affixing element, means for supporting a stamp strip, and a stamp guide extending between the two, of a reciprocatory carriage associated with the guide, a plurality of feeding fingers mounted on the carriage and adapted to engage the perforations of a stamp strip, a rock arm connected to actuate the carriage, a driving shaft for the stamp affixing element, and a crank and pitman connecting the shaft and rock arm, said pitman having a slip connection at one end whereby the stamp feeding means may be rendered inoperative.

32. In a mail handling machine, the combination with a stamp affixing element, means for supporting a stamp strip, and a guide extending from the latter to present a stamp to the former, of a reciprocatory carriage associated with the guide, a plurality of feeding fingers mounted on the carriage and adjustable relatively thereto, said fingers being adapted to engage the perforations of the stamp strip, a severing knife associated with the guide to sever the stamp so presented, and means for actuating the carriage with an amplitude greater than the distance between perforations by terminating at the end of the stroke a fixed distance from the severing point.

33. In a mail handling machine, the combination with a stamp affixing element, means for supporting a stamp strip, and a stamp guide extending between the two, of a reciprocatory carriage associated with the guide, a yoke connected to actuate the carriage and comprising a pair of rock arms connected by a bar, a driving shaft for the stamp affixing element having a wrist pin thereon, a pitman having a slip connection with the wrist pin at one end and slidable on the bar at the other end to disconnect the yoke from actuation by the shaft and render the feeding means inoperative, and a spring on the bar engaging the pitman to maintain it in operative position.

AZEL GAY.